United States Patent

[11] 3,559,554

[72] Inventor Gunter Schmidt
Marina Del Rey, Calif.
[21] Appl. No. 732,186
[22] Filed May 27, 1968
[45] Patented Feb. 2, 1971
[73] Assignee Productron, Inc.
Los Angeles, Calif.
a corporation of California

[54] CHIP FILM PROCESSOR
6 Claims, 15 Drawing Figs.

[52] U.S. Cl. .......... 95/89, 95/94
[51] Int. Cl. .......... G03d 3/08
[50] Field of Search .......... 95/89, 94

[56] References Cited

UNITED STATES PATENTS 3,277,809 11/1966 Guzzardi et al .......... 95/89X
3,446,134 5/1969 Brown et al .......... 95/89

*Primary Examiner*—John M. Horan
*Assistant Examiner*—Alan Mathews
*Attorneys*—Samuel Lindenberg and Arthur Freilich

ABSTRACT: Apparatus for processing packaged dental film chips without a darkroom comprising a daylight loader for stripping the coverings from a film chip and inserting the chip into a light-tight magazine, and a developer for receiving the magazine and moving the film chip therefrom through the processing solutions. The daylight loader comprises a hub that engages a tab on the film chip package to peel off an outer layer, and an assembly that holds another protective layer of the package away from the film chip while a roller moves the chip toward a slot that leads to the magazine. The developer comprises a pair of plates having grooves that confine the film to movement successively into the tanks, and motor driven belts with fingers that push the chip along the grooves.

INVENTOR.
GUNTER SCHMIDT

BY Lindenberg & Freilich

ATTORNEYS

INVENTOR.
GUNTER SCHMIDT

BY Lindenberg & Freilich

ATTORNEYS

INVENTOR.
GUNTER SCHMIDT
BY Lindenberg & Freilich
ATTORNEYS

INVENTOR.
GUNTER SCHMIDT
BY Lindenberg & Freilich
ATTORNEYS

INVENTOR.
GUNTER SCHMIDT
BY Lindenberg & Freilich
ATTORNEYS

CHIP FILM PROCESSOR

BACKGROUND OF THE INVENTION

1. Field of the Invention

This invention relates to film processing apparatus, and more particularly to apparatus for processing individual film chips or sheets.

2. Description of the Prior Art

Dental X-ray photographs are generally made using film packages that comprise a small stiff chip of film. The film chip is covered on both faces by a thin cardboard sandwich, a sheet of lead on one side of the cardboard sandwich, and a soft plastic covering that completely envelopes the other layers. The developing of such film chips has generally required darkrooms, wherein the package was hand opened and the film chip dipped into tanks of processing chemicals. Various aids have been proposed for automatically dipping the chip into the chemical tanks for the proper times. However, a darkroom environment has been required for at least part of the operation, particularly during the stripping away of the film chip coverings and during the loading of the chip into apparatus that can dip it into the tanks.

In dental offices that process their own film, the necessity for a darkroom results in a waste of space and in annoyances in performing operations in the dark. Apparatus of relatively simple construction and low cost, which enabled rapid and trouble-free dental film processing without the necessity for a darkroom at any stage, would be of great value in dental offices.

OBJECTS AND SUMMARY OF THE INVENTION

One object of the present invention is to provide apparatus for processing dental film in an ordinary lighted room.

Another object is to provide apparatus for stripping a covering from a film chip and feeding the chip into a light-tight magazine, which enables the operation to be performed in an ordinary lighted room.

Still another object is to provide simple and economical apparatus for automatically processing a film chip.

In accordance with the present invention, film chip processing apparatus is provided comprising stripping apparatus and developing apparatus. The stripping apparatus strips away the protective covering on a film chip and inserts the chip into a light-tight magazine. The developing apparatus receives the film chip from the magazine and moves it through several tanks containing processing solutions, and then inserts the developed film in a holder for viewing. The mechanisms protect the chip from ambient light so that all steps can be performed in an ordinary lighted room.

The stripping apparatus comprises a peeling assembly for removing the outer covering on the film chip package. It also includes a separation assembly for separating the film chip from other protective layers and moving only the chip toward an exit slot, and a magazine holder for holding a magazine against the exit slot to receive the film chip. The peeling assembly comprises a slotted hub for receiving a tab formed on the outside of chip packages. With a chip package tab engaged in the slot, a knob on the outside of the housing is turned to peel away the outer package cover.

During peeling, the film chip and its protective layers are moved to the separation assembly. The latter assembly includes a bar that engages a cardboard protective layer lying against the film chip, to hold the layer out of the way, and a roller that engages the film chip to move only the chip toward the exit slot. A magazine held on the other side of the slot has a chamber that receives the film chip. The magazine has a light-tight cover that is opened by bosses on the stripper housing, the cover automatically closing when the magazine is removed from the housing.

The developing apparatus which receives a film chip from the magazine has a loader fixture for receiving the magazine. Bosses are provided at the loader fixture which open the magazine cover and allow the film chip to fall into a transport assembly. The transport assembly comprises a pair of plates with grooves defining a continuous chip path along which the film chip moves. The path has several loops, each loop carrying the film down into a tank filled with a processing chemical and then over into the next tank. Belts extend along each loop, each belt having a hook or finger that engages a film chip to move it along a portion of the path. A chip holder at the end of the path receives the developed film chip to facilitate its viewing.

The belts which move the chip along the path operate intermittently so that they are stationary during most of the time that the chip remains in a tank. When the belts move, they move at an appreciable speed, so that they stir up the solutions in the tanks. The apparatus is constructed so that the belts make a complete revolution prior to stopping with a chip in the tank, to assure that the chip is developed in an agitated solution.

The novel features of the invention are set forth with particularity in the appended claims. The invention will best be understood from the following description when read in conjunction with the accompanying drawings.

DESCRIPTION OF THE PREFERRED EMBODIMENTS

Figures 1, 2:
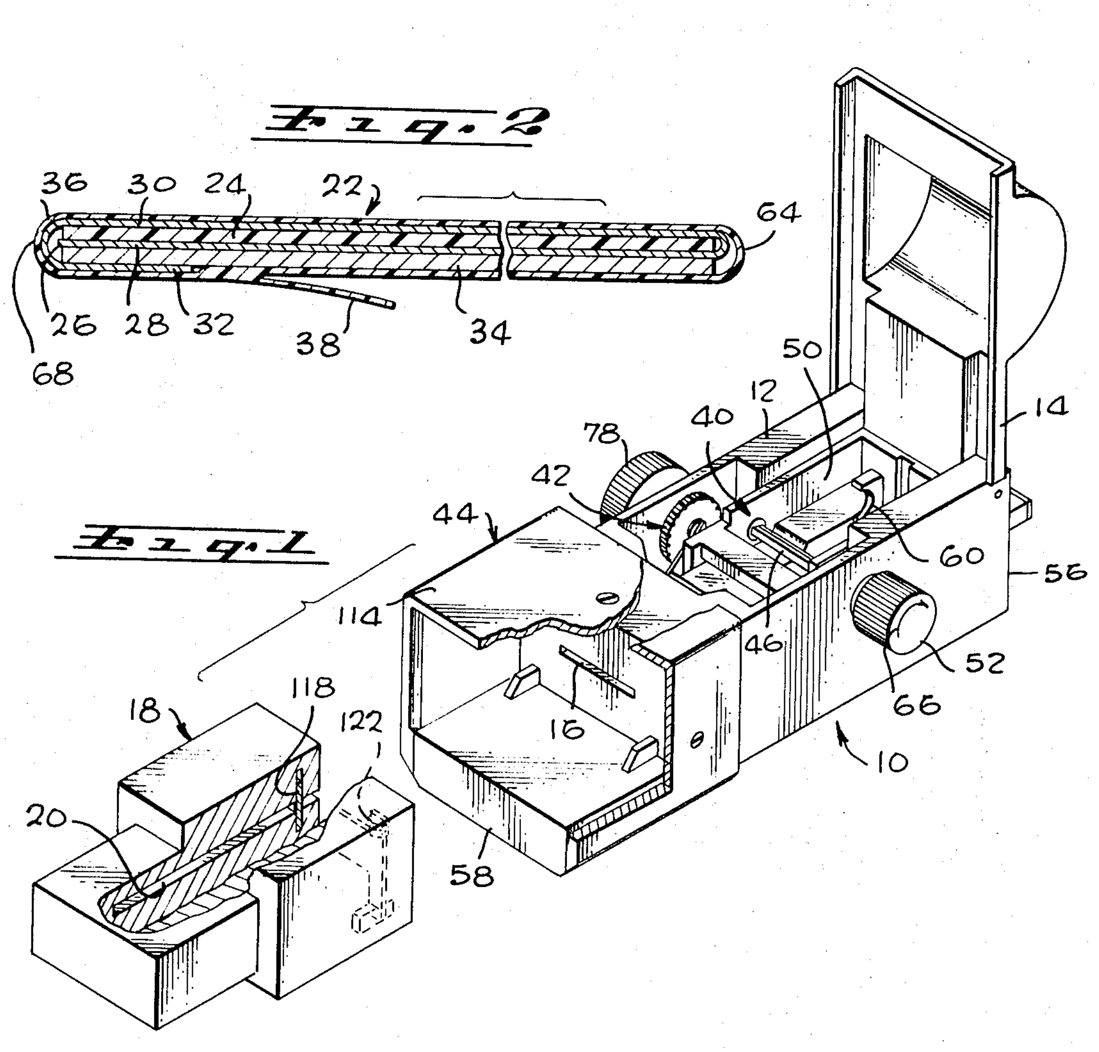
FIG. 1 is an isometric view of a stripper apparatus constructed in accordance with the invention.
FIG. 2 is a sectional view of a dental film chip package, of a type which can be used in the stripper apparatus of FIG. 1.

FIG. 1 illustrates a stripper apparatus 10 comprising a housing 12 which receives a dental film chip package. With a cover 14 closed over the housing, the apparatus removes all of the protective coverings on the film chip within the package and moves the chip through an exit slot 16. A light-tight magazine 18 is positioned against the exit slot, to receive the film chip into its magazine chamber 20. The magazine is then removed from the housing and can be inserted into a developing apparatus to develop the film chip.

FIG. 2 is an enlarged sectional view of a typical dental film chip package of a type which can be stripped by the stripper apparatus of the invention. The package 22 comprises a film chip 24 which is typically a stiff sheet of transparent plastic with a photographic emulsion thereon. A sandwich 26 of thin stiff cardboard is disposed against the two faces of the film chip. The cardboard sandwich includes a lower sheet 28 disposed against the lower face of the film chip, an upper sheet 30 disposed against the upper face of the film chip, and a flap 32. A lead sheet 34 is disposed against the lower cardboard sheet, and the cardboard flap 32 extends around the lead sheet. An encapsulating envelope 36 of soft plastic is disposed around the other layers, including the sides of the layers, to form a light-tight capsule or package. A tab 38 is formed in the encapsulating envelope, on a face thereof adjacent to the lead sheet.

Hand opening of the package 22 is generally accomplished by pulling on the tab 38 to tear away the encapsulating envelope. The cardboard flap 32 is lifted and the film chip 24 is removed from the cardboard sandwich, for developing. The stripper apparatus of the invention is constructed to strip away the protective coverings on the film chip to prepare it for developing, while protecting the chip from ambient light, thereby eliminating the need for a darkroom.

The stripper apparatus 10 may be considered to comprise three assemblies for performing three main functions in readying the film chip for developing. A stripping or peeling assembly 40 is provided which serves to peel away the encapsulating envelope 36 of the film chip package. A separation and transport assembly 42 is provided which receives the chip package with the envelope removed, separates the film chip 24 from the cardboard and lead sheets, and moves only the film chip toward the exit slot 16. A magazine receiving assembly 44 on the forward end 58 of the housing holds the magazine 18. The receiving assembly holds the magazine in position to receive a film chip that passes through the exit slot, and prevents light from reaching the chip during transfer into the magazine.

Figure 3:
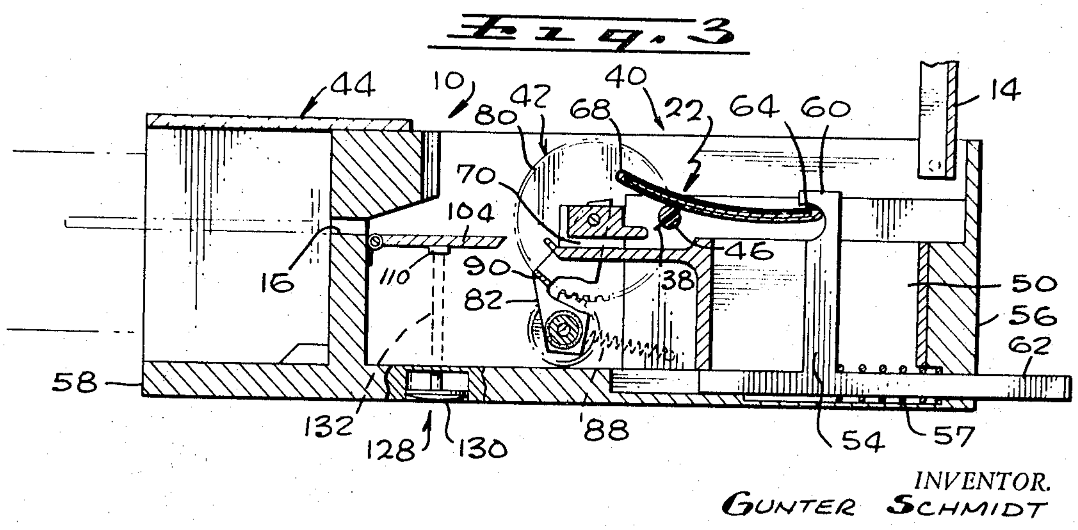
FIG. 3 is a sectional, side elevation view of the stripper apparatus of FIG. 1, shown during the initial loading of a film chip package therein, and FIG. **3*a*** is an enlarged partial view shown at the same stage of operation.

As shown in FIG. 3, the stripping assembly 40 comprises a stripping hub 46 formed by two closely spaced bars that define a slot 48 between them. The stripping hub is rotatably supported at opposite ends on the walls of a bed 50 disposed within the housing. One end of the hub 46 projects through the side of the housing, and carries a stripper knob 52 which can be hand turned to rotate the hub. The slot 48 in the stripping hub is adapted to receive the tab 38 on a film chip package. The stripper knob 52 is then turned to rotate the hub, to peel off the encapsulating envelope of the package starting with the tab.

The stripping assembly 40 also includes an indicator bar 54 which is constrained to sliding movement by slots in the bed 50 and the rearward or back end 56 of the housing. A spring 57 biases the indicator bar toward the front end 58 of the housing. The indicator bar has a film engaging portion 60 including a circular cutout which receives one end of a film package. In the course of peeling the outer envelope, the film package moves toward the back end of the housing and then forward, thereby moving the film engaging portion 60 of the indicator bar backward and then forward. The indicator bar has an indicator end 62 which projects from the rear of the housing. The indicator end 62 moves backward and then forward in the course of the peeling operation. It serves to indicate that the peeling operation is progressing satisfactorily, and also to indicate when the peeling operation is completed.

The stripper apparatus 10 is utilized by lifting the cover 14 and placing the film package 22 within the housing, as shown in FIG. 3. The tab 38 of the package is inserted into the slot 48 of the stripping hub, while the rearward end 64 of the package, which is furthest from the tab, is engaged in the film engaging portion 60 of the indicator bar. The cover 14 is then closed over the housing to provide a light-tight seal for the film package. Next, the stripper knob 52 is rotated in the clockwise direction shown by the arrow 66 of FIG. 1, to rotate the stripping hub.

Rotation of the stripping hub 46 causes the encapsulating envelope to be peeled off of the package and wound about the hub. The rest of the package is prevented from turning by the film engaging portion 60 of the indicator bar, although in the absence of portion 60, the bed 50 would serve this function. During the initial stripping of the bottom portion of the envelope, the film package 22 moves rearwardly, thereby pushing the indicator bar 54 rearwardly. Such rearward movement continues until the hub has peeled the envelope up to the forward end 68. Further turning of the stripper knob causes the forward end 68 of the package to move under the stripping hub to the position shown in FIG. 4.

Figure 4:
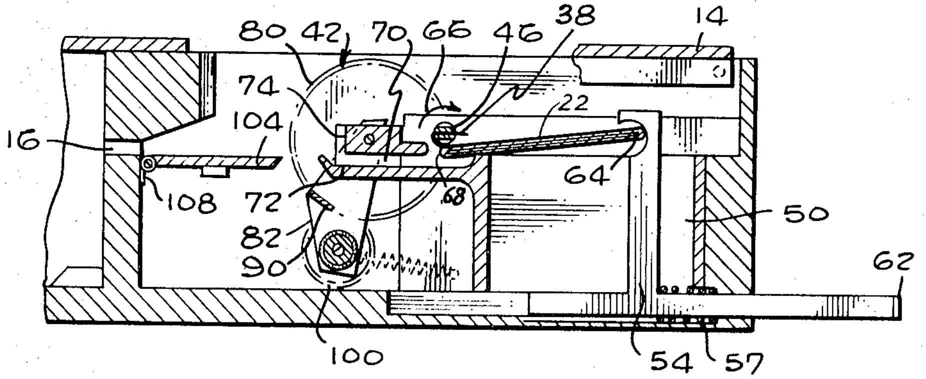
FIG. 4 is a partial sectional view of the stripper apparatus shown in the course of the outer cover peeling operation.

During the initial peeling, while the package moves from the position shown in FIG. 3 to that shown in FIG. 4, the indicator end 62 of the indicator bar moves rearwardly and then begins to move forward again. The person operating the stripper apparatus can determine whether the package is being properly stripped by noting whether the indicator end 62 moves rearwardly during the initial turning of the stripper knob. If the indicator end 62 does not move rearwardly, the probable cause is that the envelope tab 38 has slipped out of the stripping hub slot. If this occurs, the cover must be raised for reinsertion of the tab in the slot. The positive indication provided by the indicator end 62 is extremely important, inasmuch as opening the cover after actual peeling has begun can expose the film chip to light and ruin the photograph.

Turning of the stripper knob to rotate the stripping hub continues after the position shown in FIG. 4 has been reached. During subsequent turning, the top layer of the encapsulating envelope is peeled off of the film package 22. At the same time, the front end 68 of the film package moves under the stripping hub and into a passageway 70 formed between a lower guide 72 and an upper guide 74 that extends across the bed 50 at a position forward of the stripper hub. As the film package moves through the passageway, the indicator bar 54 moves forward until the indicator end 62 reaches a forward position where it barely projects from the rear of the housing.

When the encapsulating envelope of the film package has been stripped back to the rear end 64, only a small portion of the encapsulating layer is still on the package, this last portion extending along the bottom surface of the package. It is not necessary to wind this last portion on the stripping hub, although no harm is done by winding it thereon. Thus, the stripping knob 52 can be turned until the indicator end 62 of the indicator bar reaches its most forward position, and the turning can then be either stopped or continued. The fact that the indicator end has reached its forward position indicates that the next operation can be performed.

Figure 5:
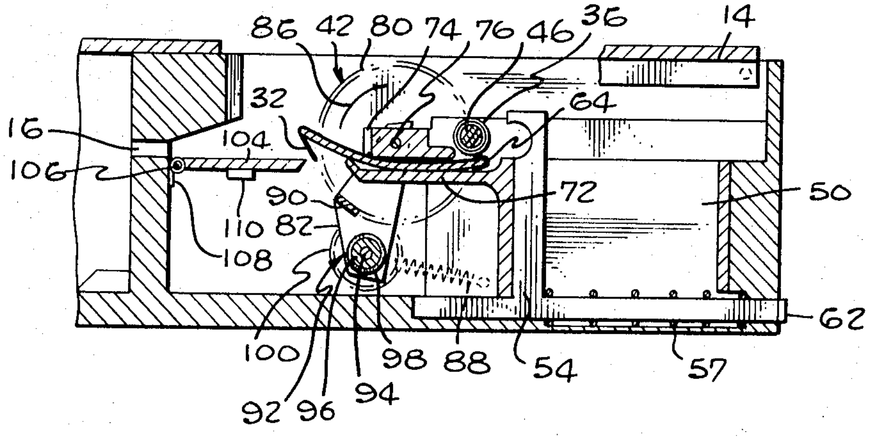
FIG. 5 is a partial sectional view of the stripper apparatus shown near the end of the outer cover peeling operation.
Figure 8:
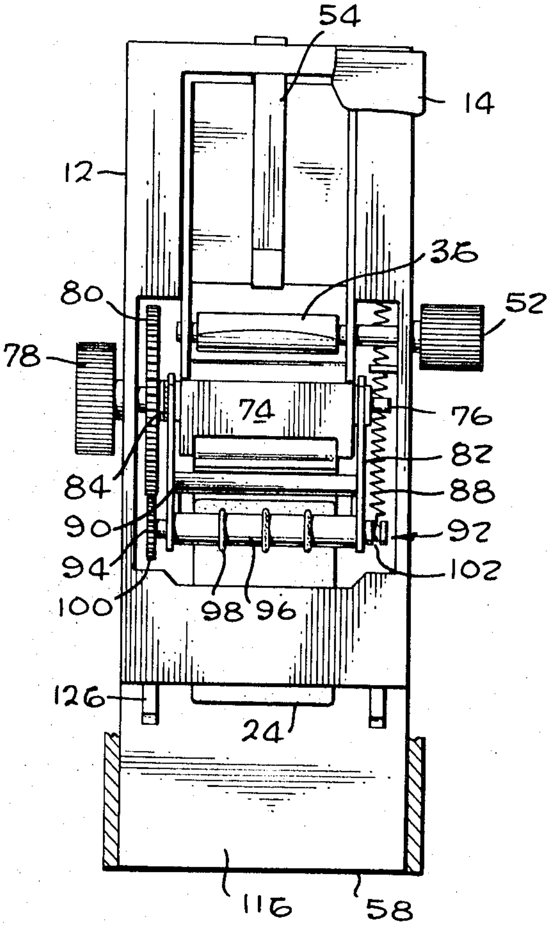
FIG. 8 is a plan view of the apparatus of FIG. 1 with the cover removed, shown during the operation step of FIG. 7.
Figure 3A:
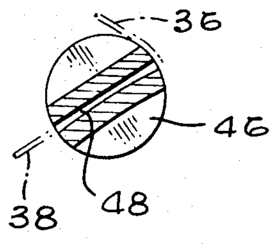
Figure 6A:
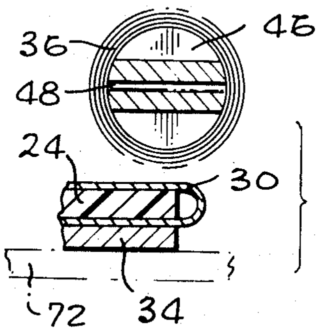

The next operation in the disassembly of the film package is the separation of the cardboard sandwich 26 from the film chip, and the movement of only the film chip towards the exit slot 16. This is accomplished by the separation assembly 42. As shown in FIGS. 5 and 8, the separation assembly comprises a shaft 76 rotatably mounted in the upper guide 74. The shaft has an outer end extending through a side of the housing and fixed to a transport knob 78. A gear 80 is fixed to the shaft 76 at a position between the upper guide 74 and the walls of the housing. An arm assembly 82 which includes two spaced arms, has an inner end rotatably mounted on the transport shaft 76. The arm assembly is confined to rotation around the shaft, but can rotate independently of it. However, a ratchet wheel mechanism 84 is provided which allows the transport shaft to turn the arm assembly 82 in a clockwise direction shown by the arrow 86. A spring 88 tends to rotate the arm in a counterclockwise direction.

The middle portions of the arms of the arm assembly 82 are connected by a laterally extending separator bar 90. The outer ends of the arms carry a roller assembly 92. The roller assembly comprises a roller shaft 94 extending laterally between the two arms 82 and pivotally supported thereon. A roller 96 is fixed to the roller shaft and extends between the arms. Three rubber O-rings 98 are disposed on the roller at three locations along its width. A pinion 100 is fixed to the roller shaft at a position between one of the arms and the housing, so that the teeth of the pinion are engaged with those of the gear 80. A groove 102 at the opposite end of the roller shaft carries one end of the spring 88.

Figure 6:
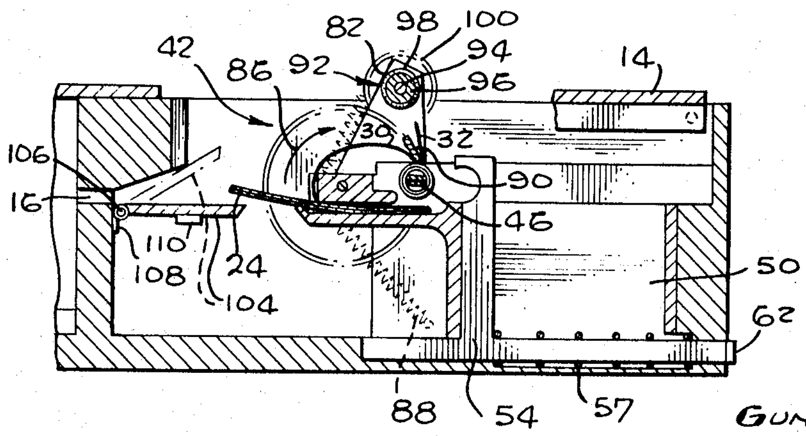
FIG. 6 is a partial sectional view of the stripper apparatus shown during the separation operation, and FIG. **6*a*** is an enlarged partial view shown at the same stage of operation.

After the encapsulating envelope has been peeled from the film package, the package lies in the position shown in FIG. 5. The next step in the package disassembly process is the operation of the separation and transport assembly 42, which is accomplished by rotation of the transport knob 78 in the direction of the arrow 86. As the knob is rotated, the ratchet assembly engages the arms of assembly 82 and rotates them toward an upward position shown in FIG. 6. During rotation of the arms, the roller assembly strikes a platform 104, which is pivoted at 106. The platform is biased downwardly by a spring 108, but is prevented from movement below the horizontal by a stop 110. The roller assembly pushes up the platform until the platform is passed. The arms then move to the position shown in FIG. 6.

Figure 7:
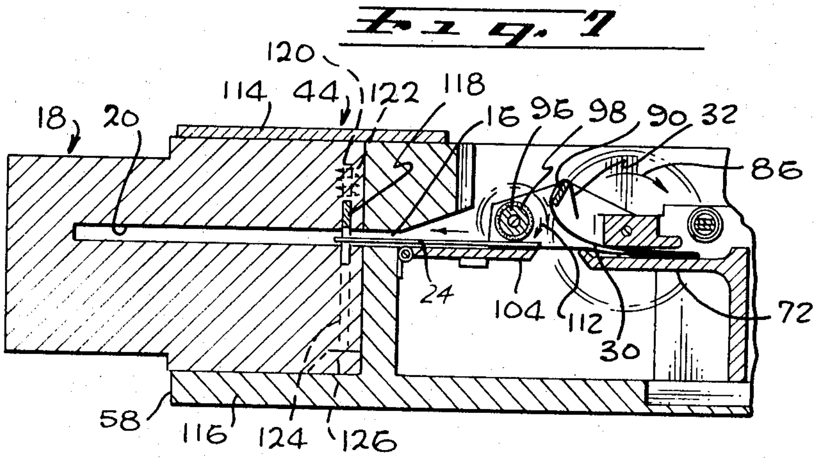
FIG. 7 is a partial sectional view of the stripper apparatus during the transport of a film chip into a magazine.

During upward movement of the arms, the separator bar 90 engages the cardboard flap 32 of the film package. This causes the upper sheet 30 of cardboard to be lifted off of the film chip 24. During the lifting operation, the film chip may be bent upward slightly, until it clears the roller assembly, but it then springs back to the position shown in FIG. 6. When the transport knob 78 is rotated far enough that the separator bar 90 strikes an upper surface of the bed 50, the knob cannot be rotated any further. The transport knob is then rotated in the opposite direction. This allows the arms 82 to move down until the rubber rings 98 on the roller shaft 94 lie on the film chip 24. The film chip and the cardboard and lead sheets under it are then supported on the platform 104, as shown in FIG. 7. The separator bar is maintained above the platform because part of the periphery of the O-rings lies behind the separator bar with respect to rotation in the direction of arrow 86.

Rotation of the transport knob 78 is continued in the direction opposite to that of the arrow 86 while the apparatus is in the configuration of FIG. 7. This causes the gear 80 to rotate the pinion 100 in the direction of the arrow 112. Such rotation causes the rubber rings 98 on the roller to move the film chip 24 toward the exit slot 16. Only the film chip is moved, inasmuch as the cardboard sandwich is still held back, by reason of the engagement of the separator bar 90 with the flap 32 of the sandwich. Finally, the film chip is about half way through the exit aperture 16, and the rubber rings on the roller 96 bear against the cardboard sandwich and the lead sheet thereunder. Any further rotation of the transport knob merely causes the rubber rings to slip on the cardboard sandwich.

The final movement of the film chip 24 into the magazine chamber 20 is accomplished by picking up the entire stripper assembly and holding it with the front end 58 pointed down. The chip 24 then falls into the magazine chamber. The magazine 18 is held in position with its chamber 20 aligned with the exit slot 16 by the magazine receiving assembly 44. The receiving assembly comprises a shroud 114 which fits around a base 116 at the forward end of the housing, to provide a space for receiving the magazine. The shroud 114 forms a protective cover to shield the film chip 24 against light during its passage through the exit slot 16 into the magazine.

The magazine has a cover 118 which moves within a slot in the magazine. The cover has a pair of upwardly extending legs, shown at 120, on either side. Springs 122 disposed about each leg bias the cover toward a downward position wherein the cover is closed over the end of the magazine chamber. The cover also has a pair of downwardly extending legs 124. Bosses 126 fixed to the base 116 engage the legs 124 to move them and the cover 118 upwardly. When the cover 118 is moved up, the film chip can slide into the magazine chamber. After the film chip is in the chamber, the magazine 18 is pulled out of the space enclosed by the shroud 114. The legs 124 become disengaged from the boss 126, and the cover 118 over the magazine chamber moves down to cover the chamber and prevent light from entering therein. Thus, the legs 120 and 124 serve as cover moving means for moving the magazine cover over and away from the chamber opening, and the bosses on the housing operate these cover moving means by pushing the legs up and allowing them to move down.

After the magazine 18 is removed from the housing, the housing cover 14 can be lifted, and the various package coverings that have been removed from the film chip package can be removed from the housing. The stripping apparatus 10 is then ready to receive the next film package to strip it. Prior to insertion of the next film package in the housing, the platform 104 should be lifted to allow the arm assembly 82 to move under the platform. In case the operator should forget to do this, and proceeds to strip the next package, the forward end of the film package will abut the roller assembly 92, and the operator will notice a resistance to rotation of the stripper knob 52. A release assembly 128, shown in FIG. 3, provides a button 130 which can be pushed from outside the housing to raise the platform 104. The button is coupled to a rod 132 that can raise the platform stop 110. As described above, the various peeling, separation and insertion operations are performed merely by turning two knobs on the housing. All of the required operations can be performed in an ordinary lighted room, and in a simple manner.

Figure 9:
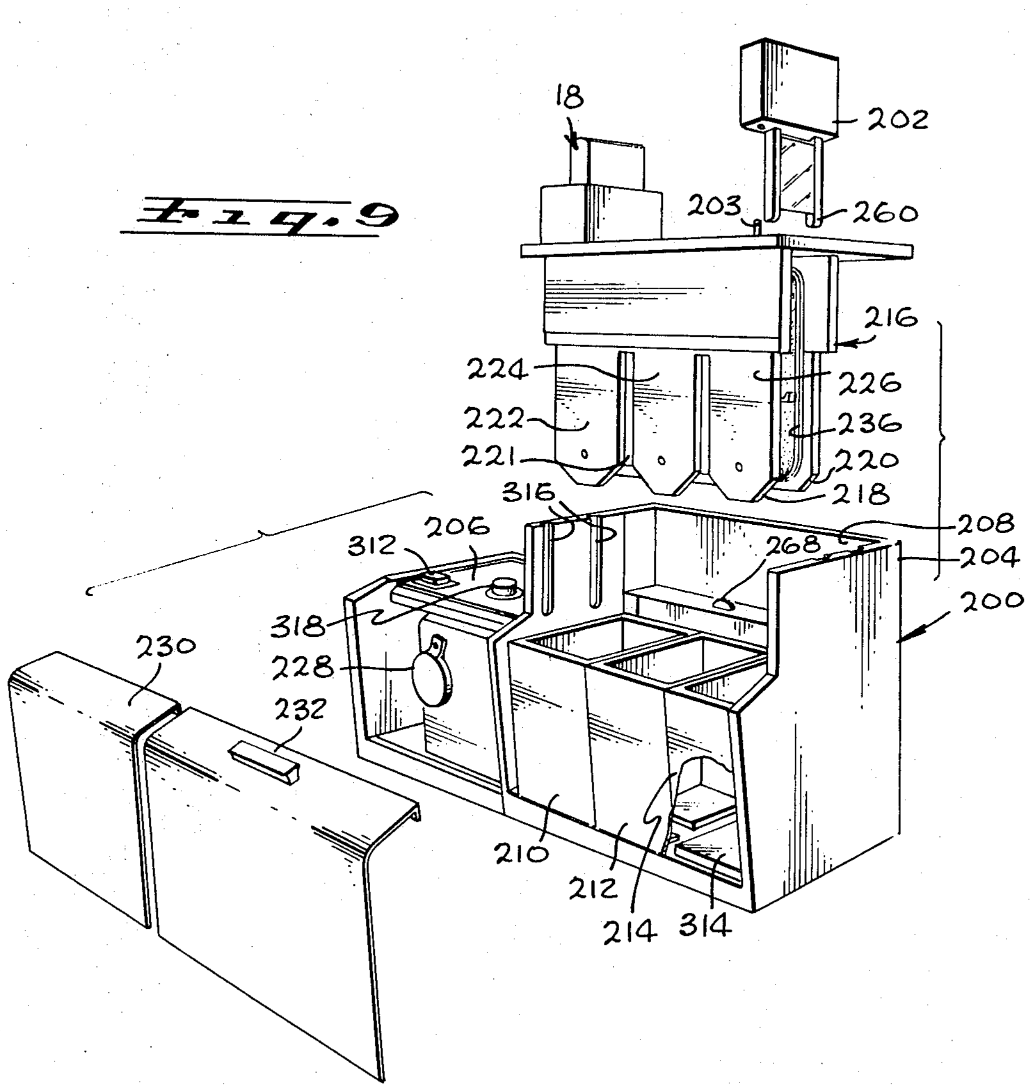
FIG. 9 is a perspective view of the developing apparatus of the invention.

Once the film chip is within the magazine 18, it is ready for insertion in further processing apparatus for developing the photographic image thereon. FIG. 9 illustrates a developer processing apparatus 200 which receives a film chip from the magazine 18, moves the chip through tanks of chemicals for the required periods of time, and inserts the developed chip into a chip holder 202 ready for viewing. The processor 200 comprises a cabinet 204 with a control section 206 and an operating section 208. The operating section holds three tanks, 210, 212, and 214, which are normally filled with developing, fixing, and washing solutions, respectively. A transport assembly 216 is positioned within the operating section 208 of the processor for carrying the film chip through the solutions in the tanks.

The transport assembly has a front plate 218 and a rear plate 220. The separation of the plates is less than the length of the tanks as measured from their fronts to their backs. The plates are divided by slots 221 into three sections 222, 224, and 226, the sections fitting into the three tanks 210, 212, and 214, respectively. The plates 218, 220 have grooves that define a chip path along which the chip travels during processing. The path extends from the area where the magazine 18 is received, into three downwardly extending loops that bring it successively into the three tanks, and finally to the position of the chip holder 202. The control section 206 contains a motor 228 for powering the transport assembly, and various control components that govern the operation of the mechanism. A pair of covers 230 and 232 fit over the front of the cabinet to enable access to the sections for cleaning and repairs.

Figure 10:
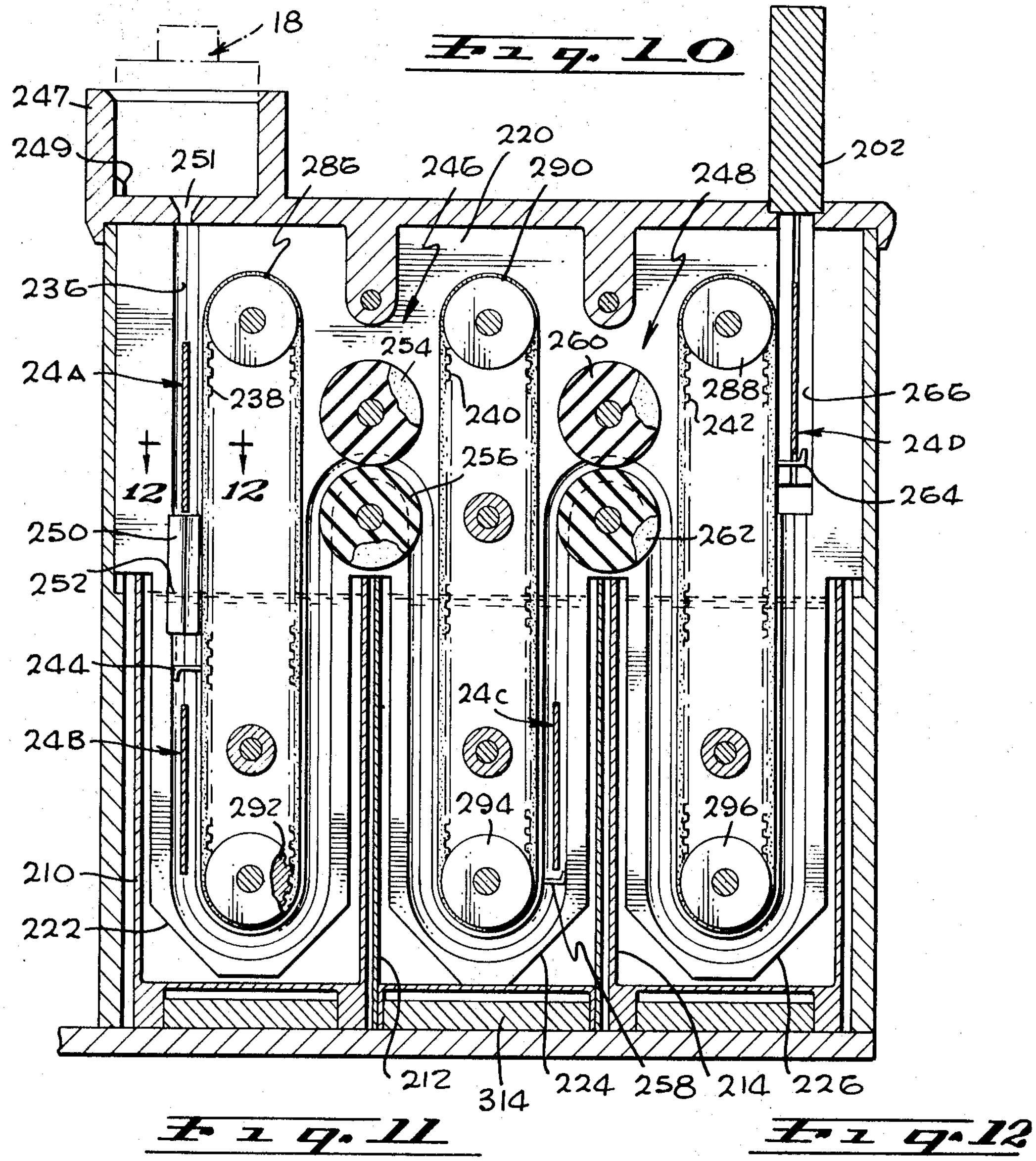
FIG. 10 is a partial sectional side view of the developing apparatus of FIG. 9.
Figure 12:
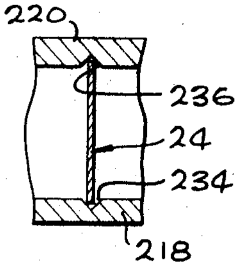
FIG. 12 is a partial sectional view taken on the line 12–12 of FIG. 10.

FIG. 10 shows the mechanism within the transport assembly which moves the film chip through the processing tanks. The chip path is defined by two parallel guides in the form of a pair of grooves 234 and 236 in the plates 218 and 220, a cross section of the grooves being shown in FIG. 12. The chip path extends from the position where the chip is received, through the three tanks, and to the position where the developed chip is delivered. A chip is driven along portions of the path by three timing belts 238, 240, and 242. Each timing belt has one hook or finger, such as finger 244 on belt 238, that projects outwardly across the chip path. As a belt rotates, the finger 244 pushes a chip along a portion of the path. Two pairs of transfer rollers 246 and 248 engage the chip to move it from a path portion along one belt to a path portion along the next belt.

The transport assembly is controlled so that the chip moves in steps along the chip path, stopping for a predetermined period at the bottom of the first tank 210 and again at the bottom of the second tank 212. Between such stationary periods, however, the belts move at a relatively rapid rate. The three belts 238, 240, and 242 are synchronized so that they all move together, and all move at the same speed. A film chip is loaded into the processing apparatus by inserting a film magazine 18 into a receiving housing 247 which is located at the beginning of the chip path. The insertion of the magazine into the housing causes bosses 249 within the housing to open the light sealing cover of the magazine, in the same manner as described above in connection with the stripper apparatus. The chip is released and falls down through an entrance opening 251 into the path defined by the grooves in the plates. The receiving housing serves as a shroud to shield the film chip against light.

When the chip is released, it falls down until it reaches a constricted path section 250. The grooves are shallow at the constricted section so that the chip does not move freely therethrough, although it can be readily pushed therealong. This is accomplished by covering each groove along the constricted path section with a sheet of material. The film chip remains at the position 24A with its front end bearing against the constricted path portion 250. At this time, which is prior to the start of the apparatus, the finger 244 on the first belt 238 is located immediately below the constricted path section 250. After the magazine is inserted and the chip falls to position 24A, the operator starts the apparatus, as by pushing a "-start" button 312. Each of the belts is then driven to make one revolution in a short period of time such as 3 seconds, and then all belts are stopped. During this first revolution, the finger 244 engages the film chip, only when the belt has made almost a complete revolution. As a result, the finger 244 moves the chip only from the position 24A to the position 24B. At 24B, however, the chip is entirely within the developing solution held in the tank 210, the tank having been filled to the level shown at 252.

After the required developing time, such as 10 seconds, the transport assembly is reenergized and all belts rotate another turn at the same rapid speed as for the first revolution. During the second revolution, the finger 244 moves the film chip down around the first loop of the chip path, and into the first pair of transfer rollers 246. The first pair of rollers comprise an upper roller 254 and a lower roller 256, both of which are driven. The rollers are driven so they have a surface speed which is somewhat greater, such as 20 percent greater, than the speed of the belt 238. As a result, once the film chip is engaged between the rollers, its rear portion "steps away" from the finger 244. This prevents mangling of the film chip as the finger 244 passes by the rollers.

The pair of rollers 246 move the film chip from a position over the first tank 210 to the path portion which leads towards the bottom of the second tank 212. In addition to moving the film chip along the curved path portion, the rollers act as a squeegee to remove excess developer solution from the film chip and therefore prevent excessive contamination of the fixing solution in the next tank 212. As the belts continue to move through their second revolution, the film chip passes the rollers 246 and falls down into the tank 212. A finger 258 on the second belt 240 immediately reaches the film chip and moves it to the position shown at 24C. At this point all of the belts have completed their second revolution, and the transport mechanism stops.

While the film chip is at 24C, the transport assembly remains stationary for a period, such as 45 seconds, which is required for the fixer solution in the tank 212 to act on the film chip emulsion. The apparatus is then energized again to cause the belts to make a third revolution. During the third revolution, the film chip is moved from the position 24C to the curved path portion at the pair of rollers 248. The pair of rollers, which comprise an upper roller 260 and lower roller 262, act in the same way as the pair of rollers 246, in stepping the film chip away from the previous belt finger and moving it into the next tank. The film chip falls into the third tank 214 which is filled with a washing solution. It is immediately engaged by a finger 264 on the third belt, the finger pushing the chip through the washing solution and up into the position 24D.

At the position 24D, the film chip is held in a constricted path portion between the legs 266 of the chip holder 202. The film chip has now been completely developed, and the chip holder 202 can be pulled out to carry out the developed chip. The chip holder 202 is held in moderately tight engagement with the cabinet by a pin 203, to prevent its upward movement as the chip is inserted between its legs.

The three belts 238, 240, and 242 are identical and all are driven simultaneously at the same speed for a distance of one revolution at a time. The belts are timing belts, with projections along their inner surface that engage sprockets on the belt driving sprocket wheel 286, 288, 290, 292, 294, and 296. The projections on the inside of the belts help to stir the solution in the tanks as the belts move therein. As mentioned above, each belt moves at a relatively rapid rate for a complete revolution, prior to stopping with a chip. As a result, the solutions are agitated just prior to the reception of a film chip. Such agitation of the developing and fixing solutions is important to assure that they operate with a predictable strength on the photographic emulsion. The use of grooves to guide the film chip along the chip path and the use of fingers to push the film chip along, assures that only the edges of the chip are in sliding contact with transport elements. The emulsion is delicate and if it were in sliding contact with an element it might be damaged. The pairs of transfer rollers 246 and 248 do contact the emulsion; however, the roller surfaces are not in sliding contact with the chip, but are only pressed thereagainst. This is assured by driving both of the rollers of each pair, as will be described below.

Figure 11:
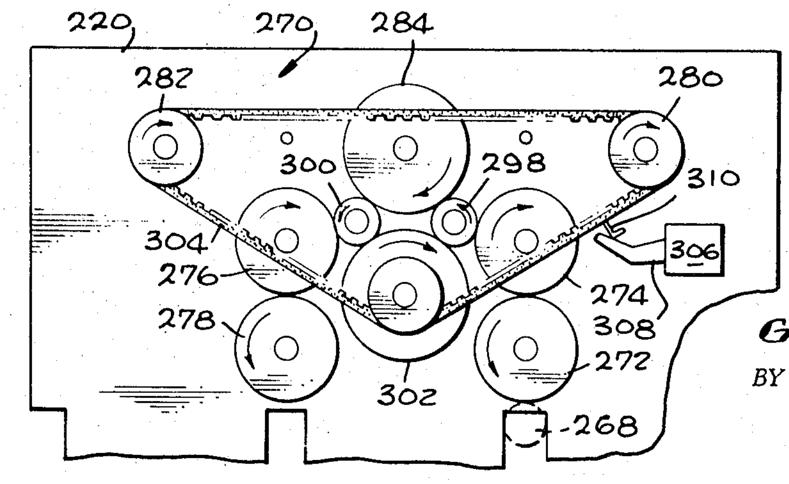
FIG. 11 is a partial rear view of the developing apparatus of FIG. 10.

The motor 228 which operates the transport assembly delivers power through a driving gear 268 that projects into the operating section of the processor. This helps to separate the motor and timing mechanism from any spilled solutions in the operating section. A gear and belt driving assembly 270 mounted on the rear plate 220 of the transport assembly, shown in FIG. 11, transmits power to the finger driving belts and transfer rollers. The driving assembly includes gears 272, 274, 276, and 278 which are fixed to the same shafts as the transfer rollers 256, 254, 260, and 262, respectively. The gears 272 through 278 are all of the same size and are driven at the same speed. Two drive sprockets 280 and 282 and a gear 284 are fixed to the drive sprockets 286, 288, and 290, respectively, shown in FIG. 10, which drive the belts that move the chips along the chip path. The other sprockets 292, 294, and 296, which hold the belts taut, are merely idler sprocket wheels. The driving gear 268, which is rotated by the motor, engages the first gear 272 to rotate the driving assembly. The driving assembly also includes idler pinions 298 and 300 and an idler gear and pulley arrangement 302 for transmitting power. A power belt 304 drives the drive sprockets 280 and 282 from the pulley arrangement 302.

The power belt 304 is of the same size as the three chip driving belts, and moves at the same speed and in synchronism with the chip driving belts. As a result, all four belts move, one revolution at a time, in synchronism. In order to assure rotation of the power belt 304 by only one revolution, a switch 306 is provided which has an operating lever 308 which lies adjacent to the power belt. A finger 310 on the power belt engages the lever to operate the switch 306. The switch 306 is connected to a timing mechanism within the control section of the processor. When the timing mechanism is started, as by pushing the start button 312, the motor is energized until the switch 306 is operated by reason of the engagement of the finger 310 with the switch lever.

When the finger 310 reaches the switch lever 308 to operate the switch, the motor 228 is deenergized for a predetermined time such as 10 seconds, while the film chip is in the developer tank. After the 10-second interval, the motor is again energized. The motor remains energized until the end of the second belt revolution, when the switch 306 is again operated by reason of contact of the finger 310 with the switch lever. The motor remains inactivated for a 45-second period while the film chip is in the fixer solution, and is then reactivated. After the third belt revolution, when the finger again operates the switch, the motor is deactivated indefinitely. The motor remains deactivated until the start button is pushed again, after a new film chip is loaded into the processor. Instead of the finger 310 on the power belt, any of a variety of switch operating means can be placed thereon. A finger, however, may be used so that all four timing belts are identical, and only one type of belt must be stocked for manufacture and repair of the apparatus.

Figure 13:
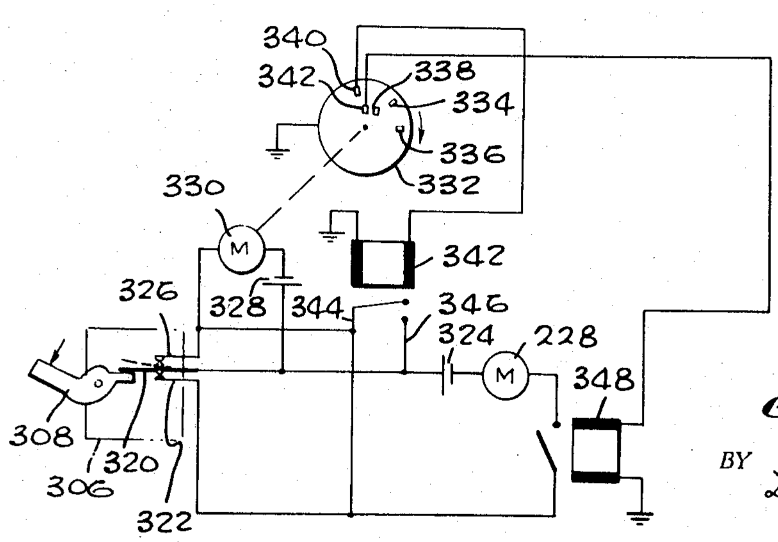
FIG. 13 is a simplified schematic diagram of a timing circuit for operating the developing apparatus of the invention.

Various timing circuits can be used to provide for the 10-second and 45-second periods during which the motor 228 is deenergized FIG. 13 is a simplified diagram of a timing apparatus which can be used. The circuit comprises a pair of switch contacts 320 and 322 which connect the motor 228 to a power source shown at 324. When the switch arm 308 is operated, the contacts 320 and 322 are separated and contacts 320 and 326 are engaged. Current then flows from a source 328 through a timing motor 330 which turns a cam 332.

The cam 332 is an electrically conductive plate which is grounded. It has an insulating layer on its cam surface, which is broken at three areas 334, 336 and 338. A pair of wipers 340 and 342 are disposed against the cam surface. The cam has an initial position shown in FIG. 13. After 45 seconds of rotation, the area 336 reaches the wiper 340. The wiper then activates a bypass relay 342, to connect together the output lines 344 and 346 of the relay. Currents for energizing the main motor 228 then flow through the output terminals of relay 342, bypassing the switch contacts 320 and 322, until the switch lever 308 is released. As soon as the switch lever is released and the bypass relay 342 is again opened, the timing motor 330 stops. At the next operation of switch lever 308, a 10-second delay occurs before the wiper 340 reaches cam area 334 and the main motor 228 is reenergized. After the third belt revolution, the cam area 338 reaches the other wiper 342, which operates a shutdown relay 348 that stops the operation of the motor 228 indefinitely. The shutdown relay can be operated to again connect the motor 228 and power supply 324, by depressing the start button 312 on the control section.

The processor 200 is generally utilized by leaving it continuously in a standby condition, wherein it is ready to accept and process a film chip. This requires that the solutions in the tanks be heated to operating temperatures. Heating pads, such as that shown at 314, which are coupled to a thermostatic control system (not shown), keep the solutions in the tanks at the proper temperatures. Typically, the developer and washing solutions in the tanks 210 and 214 are at 95° F. while the fixer in tank 212 is at 145′ F. These temperatures allow rapid processing of typical dental film chips, such as in a 60-second period. Generally, the timing mechanism is adjustable to accommodate different photographic emulsions.

The construction of the processor enables its rapid disassembly for cleaning or for changing of the solutions in the solution tanks. The covers 230 and 232 can be removed merely by pulling them out. The transport assembly 216 can then be removed by lifting it up. In order to assure proper placement during reassembly, slots 316 are formed in the cabinet walls to receive the upper portions of the plates 218 and 220 of the transport assembly. When the transport assembly is moved into place, the drive assembly thereon is automatically engaged with the driving gear 268. A rotary indicator 318 is provided on the control section, which rotates in three steps, to indicate the progress of development.

While the processor is well adapted for receiving film from a light-tight magazine to eliminate the need for a darkroom, it also can be used in a darkroom. In that case, the film chip package can be disassembled by hand. As another alternative, the stripper housing 12 can be coupled directly to the developer processor 200, eliminating the need for a magazine in the further handling apparatus used after the stripper apparatus. By employing a processor of larger size, the apparatus can be used with large film chips, which are more generally referred to as sheets of film. For different photographic emulsions, a different number of tanks than three may be used.

Although particular embodiments of the invention have been described and illustrated herein, it is recognized that modifications and variations may readily occur to those skilled in the art, and, consequently, it is intended that the claims be interpreted to cover such modifications and equivalents.

I claim:

1. Apparatus for processing a film chip contained in a package which includes a light-tight covering about the film chip comprising:

a light-tight stripper housing for receiving said package, including means for stripping away said covering about the film chip therein;

a developer having a light-tight developer housing and means within said housing for developing a film chip;

means coupling said stripper and developer housings for the passage of said film chip therebetween, including means for shielding said chip against ambient light during said passage; and said means coupling said housings comprising a light-tight magazine alternately engageable with said stripper housing and said developer housing.

2. Apparatus for processing a film chip contained in a package which includes a light-tight covering about the film chip comprising:

a light-tight stripper housing for receiving said package, including means for stripping away said covering about the film chip therein;

a developer having a light-tight developer housing and means within said housing for developing a film chip;

means coupling said stripper and developer housings for the passage of said film chip therebetween, including means for shielding said chip against ambient light during said passage; and said means within said housing for developing including a pair of parallel tracks for engaging opposite edges of said film chip, and finger means for pushing said chip along said tracks.

3. Apparatus for processing a film chip which is encapsulated in a film chip package comprising:

a transfer magazine having a light-tight chamber, a chamber opening leading to said chamber, and cover means movable over and away from said opening;

a light-tight stripper housing having walls defining an exit aperture for the passage of a film chip therethrough;

means disposed on said housing adjacent to said exit aperture for receiving said transfer magazine with the chamber opening therein aligned with said exit aperture;

shroud means disposed about said exit aperture for shielding, against ambient light, a chip passing therethrough from said stripper housing to said magazine chamber;

peeling means disposed within said housing for receiving an encapsulated film chip and removing the encapsulation about said film chip;

separation means disposed within said housing between said peeling means and said exit aperture, for moving only said film chip toward said exit aperture;

a light-tight processor housing containing processing solutions, said processor housing having walls defining an entrance opening for the passage of said film chip therethrough;

means disposed on said processor housing adjacent to said entrance opening for receiving said transfer magazine with the chamber opening therein aligned with said entrance opening;

shroud means disposed about said entrance opening, for shielding, against ambient light, a chip passing therein from said magazine chamber; and means within said processor housing for immersing in said processing solutions, a film chip received through said entrance opening.

4. The apparatus described in claim 3 wherein:

the encapsulation on said film chip comprises a covering layer having a tab;

said peeling means comprises hub means for engaging said tab, means for preventing substantial rotation of said film chip package, means for rotating said hub to peel said encapsulation while said film package moves across said hub; and including indicator means for coupling to said package, to indicate movement of said package across said hub, whereby to indicate the progress of the peeling operation.

5. The apparatus described in claim 3 wherein:

said transfer magazine includes cover moving means for moving said cover means of said magazine over and away from said chamber opening; and including operating means on said stripper housing for operating said cover moving means to move said cover away from said chamber opening when said transfer magazine is received in said means for receiving, and to move said cover over said chamber opening when said magazine is withdrawn from said means for receiving.

6. Apparatus useful in combination with a dental film chip package for initially separating the film chip therein, from its covering and for subsequently processing the film chip, said apparatus comprising:

stripper means including a light-tight stripper housing for receiving said film chip package therein, said stripper housing including selectively actuatable means for stripping said covering from said film chip and for dispensing said film chip through an exit aperture defined in the walls of said stripper housing;

processor means including a light-tight processor housing having an entrance opening;

means for coupling said stripper means and processor means for conveying a film chip from said stripper housing exit aperture to said processor housing entrance opening;

said processor means including a plurality of solution tanks and transport means for transporting a film chip conveyed through said processor housing entrance opening through said solution tanks, said transport means including:

at least one driven belt extending into said tanks and having a finger projecting therefrom for engaging said film chip; and means for guiding the edges of said film chip.